United States Patent
Bemis et al.

(10) Patent No.: US 6,813,909 B2
(45) Date of Patent: Nov. 9, 2004

(54) REINFORCEMENT MEMBER FOR A BUSHING TIP PLATE AND RELATED METHOD

(75) Inventors: Byron L. Bemis, Newark, OH (US); Timothy A. Sullivan, Newark, OH (US); Kevin D. Smith, Kanapolis, NC (US); David H. Wolf, Newark, OH (US); Jack L. Emerson, Newark, OH (US); Bruno A. Purnode, The Woodlands, TX (US); James P. Tracy, Concord, NC (US); William L. Streicher, Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 332 days.

(21) Appl. No.: 09/894,672

(22) Filed: Jun. 27, 2001

(65) Prior Publication Data

US 2003/0000259 A1 Jan. 2, 2003

(51) Int. Cl.[7] .......................... C03B 37/085; C03B 5/00
(52) U.S. Cl. ............................ 65/495; 65/499; 65/492; 65/493; 65/494; 373/28
(58) Field of Search .................. 65/495, 499, 492, 65/493, 494; 373/28

(56) References Cited

U.S. PATENT DOCUMENTS

| | | | |
|---|---|---|---|
| 3,810,741 A | * | 5/1974 | Stalego ........................ 65/474 |
| 3,920,430 A | | 11/1975 | Carey |
| 3,979,195 A | | 9/1976 | Strickland |
| 4,155,732 A | * | 5/1979 | Schlachter et al. ........... 65/495 |
| 4,164,401 A | | 8/1979 | Noji et al. |
| 4,178,162 A | | 12/1979 | Shono et al. |
| 4,941,903 A | | 7/1990 | Jensen |
| 5,312,470 A | | 5/1994 | O'Brien-Bernini et al. |
| 5,709,727 A | | 1/1998 | Bobba |
| 5,925,164 A | | 7/1999 | Dowlati et al. |
| 6,272,887 B1 | | 8/2001 | Sullivan et al. |

FOREIGN PATENT DOCUMENTS

| | | | |
|---|---|---|---|
| GB | 2 013 651 | | 8/1979 |
| SU | 618346 | * | 8/1978 ........... C08B/37/02 |
| WO | WO 98 12147 | | 3/1998 |
| WO | WO 01 02313 | | 1/2001 |

* cited by examiner

Primary Examiner—Steven P. Griffin
Assistant Examiner—Mark Halpern
(74) Attorney, Agent, or Firm—Inger H. Eckert; Maria C. Gasaway

(57) ABSTRACT

A plurality of different structural members for reinforcing a plate-like structure, such as a bushing tip plate for intended use in forming fibers from a fluid material supplied to a bushing assembly, are disclosed. Each reinforcing member includes a body having a first portion for attachment to the structure and a second portion having a profile with a variable height including at least one apex. The body may be integrally formed of a single piece of material, or two or more separate pieces of material bonded or secured together. The body may be T-shaped, L-shaped, or F-shaped in cross-section. The second portion of the body may have an inverted V-shaped profile, an inverted W-shaped profile, or an arcuate profile. The at least one apex may be located at the midpoint or elsewhere along the length of the body.

18 Claims, 6 Drawing Sheets

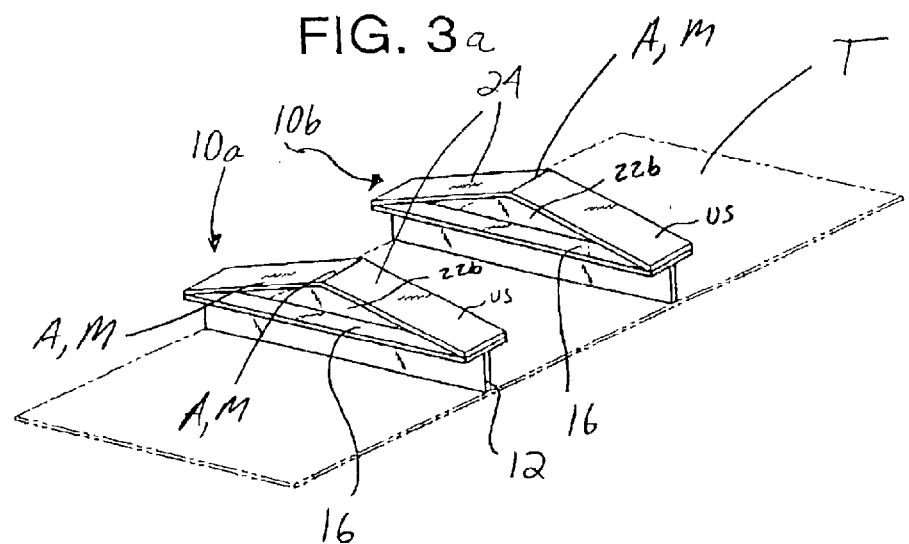
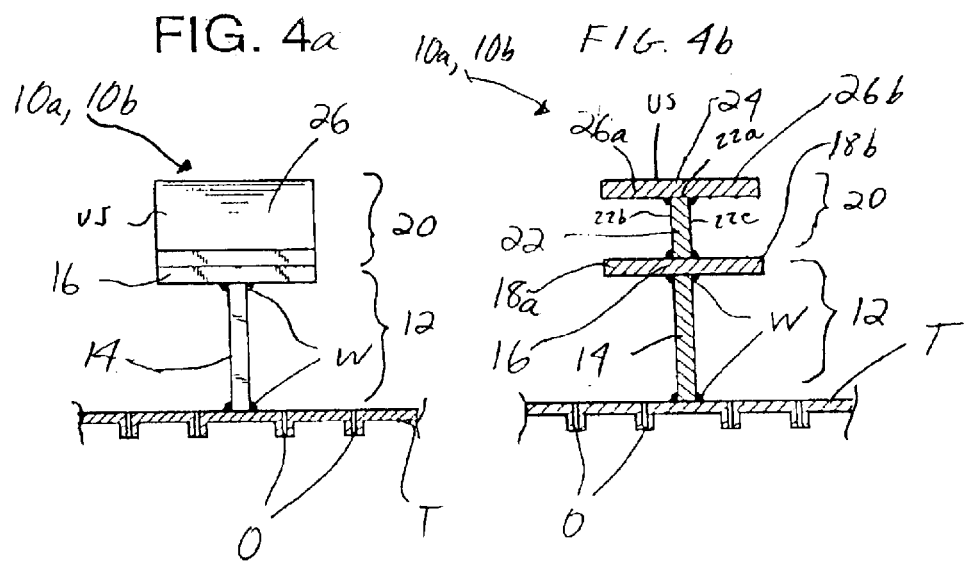

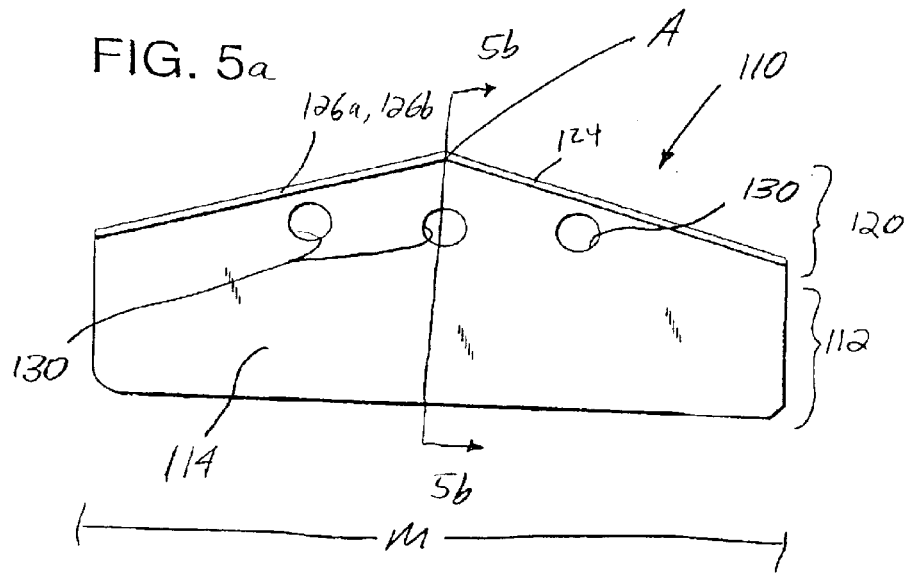
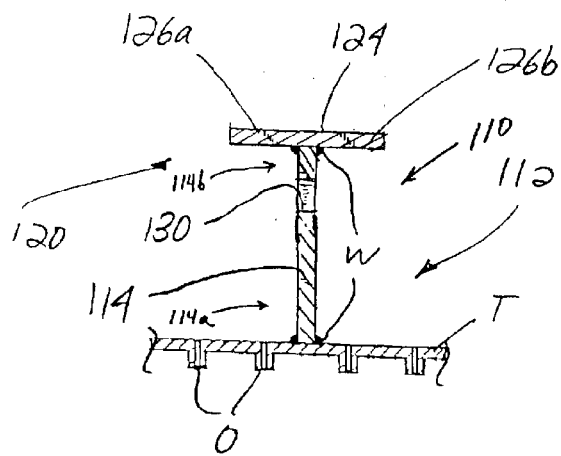
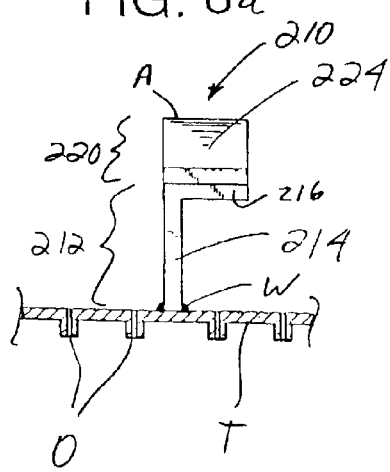

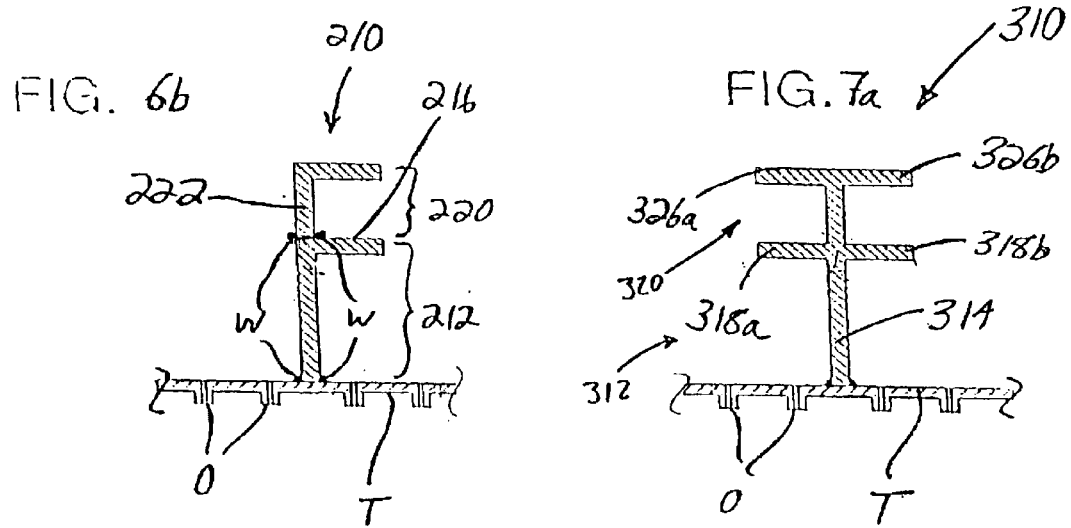
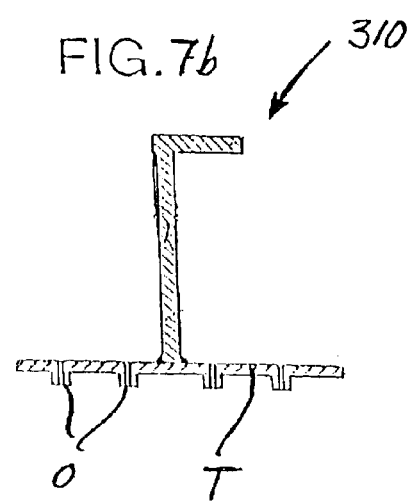

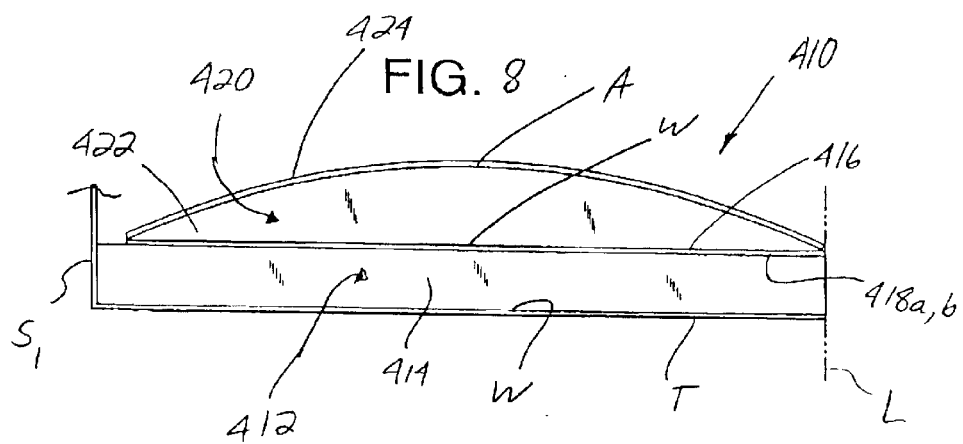
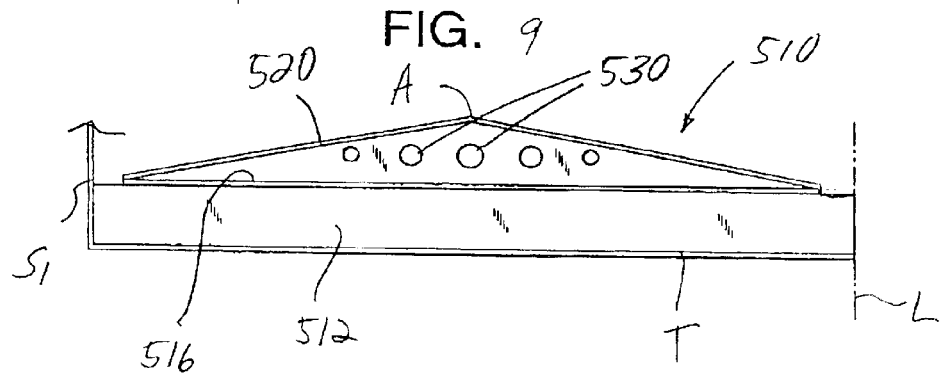
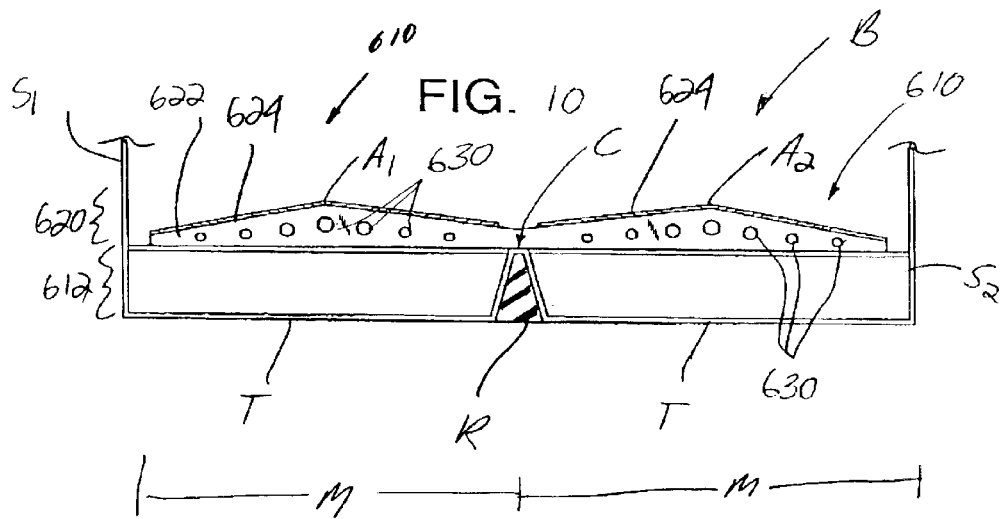

REINFORCEMENT MEMBER FOR A BUSHING TIP PLATE AND RELATED METHOD

TECHNICAL FIELD AND INDUSTRIAL APPLICABILITY OF THE INVENTION

The present invention relates generally to bushings for forming fibers from a fluid material, such as glass at an elevated temperature and more particularly, to an improved manner of reinforcing a bushing tip plate to extend the service life thereof.

BACKGROUND OF THE INVENTION

Various types of bushings or bushing assemblies for forming fibers or filaments from a fluid material, such as glass at an elevated temperature, are known in the art. Usually, the bushing or bushing assembly includes a rectangular bushing body having sidewalls and end walls. Together, the side and end walls serve as a frame for supporting or carrying one or more, often elongated plate-like structures, typically formed of platinum or alloys thereof, having a plurality of small orifices or "tips." These tips receive the molten material as it passes through the bushing body from an upstream source, such as a forehearth. To assist in keeping the material in a molten state as it enters and passes through these tips, the plates are heated, usually by electrically coupling them to a source of high current, such as a transformer. As molten glass material streams exit the tips, they are mechanically drawn to form continuous fibers which are wound onto mandrels or creels or directly chopped for later processing or use. A detailed description of the basic apparatus and methodology used is found in commonly assigned U.S. Pat. No. 5,709,727 to Bobba and U.S. Pat. No. 3,920,430 to Carey, the disclosures of which are incorporated herein by reference.

To improve the output and efficiency of the overall fiber-forming operation, it is of course desirable to maximize the number of fibers created by the tip plate. To do so, a tip plate can in theory be made infinitely large in both the width and length dimensions. However, several well-recognized problems arise, especially when the width dimension of a tip plate is significantly increased relative to the length dimension.

Perhaps the most prevalent problem resulting from increasing the dimensions of the tip plate, and in particular, the width dimension, to the degree necessary to realize a significant increase in fiber output is a sharp reduction in the service life. The tip plate is normally rectangular in top plan view, with its four side edges welded directly to the opposed side and end walls of the rectangular bushing body. When the width dimension of the tip plate increases relative to the length dimension, the plate essentially acts as a simple beam supported at the sides and ends, with no direct support at the "middle" (i.e., the portion furthest from the side and end walls of the corresponding bushing body). Significant bending stresses acting on the tip plate as the result of prolonged contact with the heavy molten material over time results in sagging due to time dependent plastic deformation, or creep. This sagging is deleterious primarily because it results in non-uniform thermal distribution and the concomitant production of fibers having substantially different diameters across the tip plate. That is, the extremes in temperature cause some bushing tips to become too cold to attenuate a fiber and others are hot enough to cause a forming instability. Both cases cause fiber breakage and a loss in conversion efficiency.

Reducing the width dimension of the plate is therefore desirable to curtail the effects of creep and increase the service life. However, the trade-off is an undesirable reduction in output and a concomitant increase in cost when only a single narrow-width tip plate is used. Also, after prolonged use, even a single narrow-width tip plate eventually suffers from creep-induced sagging, non-uniform fiber output, and increased fiber break rates.

In an effort to increase the service life of a bushing tip plate to overcome this problem and others, the present Assignee has in the past employed reinforcing members formed of platinum or a platinum alloy, termed "gussets." These gussets usually extend width-wise across the upper surface of the tip plate (i.e., between the sidewalls of the bushing body) at spaced intervals, and typically have a cross-section that corresponds in shape to a "T" or inverted "L." In use, the depending "leg" formed by the web of each gusset is secured directly to the upper surface of the tip plate, such as by laser or tungsten-inert gas (TIG) welding.

While these gussets do serve to extend the service life of the tip plate, including even in the narrow-width case, the degree of the benefit gained is somewhat limited. In particular, the gussets having a T-shaped or inverted L-shaped cross-section are also susceptible to sagging due to bending stresses and creep as the underlying tip plate. This is because the gusset, while providing some reinforcement strength, also behaves like a simple beam, and thus experiences maximum deflection at the span midpoint as in an unsupported tip plate. In other words, despite the reinforcement, the maximum or peak stress and hence, the maximum or peak sag, still occurs at the middle of the tip plate away from the side and end walls. Accordingly, a need for an improved manner of reinforcing tip plates, including those existing bushing designs (with or without gussets) with an eye toward further extending their service life is identified.

SUMMARY OF THE INVENTION

In accordance with a first aspect of the invention, a reinforcement member for a bushing assembly having a plate-like structure including a plurality of orifices for forming fibers from a fluid material is provided. The member comprises a body including a first portion for attachment to the structure and a second portion having a profile with a variable height including at least one apex. The variable height profile and the at least one apex of the body assists in reinforcing the plate-like structure against sagging and extends the service life thereof without undue alloy usage.

In one embodiment, the reinforcement member is comprised of a single piece of material, with the body including the first and second portions having an inverted L-shaped, T-shaped, or F-shaped cross-section. The profile of the second portion of the body may have an inverted V-shaped, inverted W-shaped, or arcuate profile. Preferably, the body has a length including a midpoint, with the at least one apex located substantially at the midpoint. The midpoint may also be the midpoint between the spaced sidewalls or external support points of the bushing assembly to which a first and a second end of the body are secured.

In other embodiments, the body comprises a first member defining the first portion for attachment to the structure and a second member coupled with the first member, defining the second portion and having the variable height profile with the at least one apex. The first member may have a T-shape or an inverted L-shape in cross-section. Likewise, the second member may have a T-shape or an inverted L-shape in cross-section, and may be formed from one or more component parts. Additionally, the second portion may have an arcuate profile, an inverted V-shaped profile, or an inverted W-shaped profile, each including the at least one apex. Preferably, the second member includes a web having an end that is welded directly to an upper surface of the first member, and optionally may have a profile that defines two or more apexes. In any of the embodiments, either the first or second portion of the body may include a plurality of strategically positioned openings. These openings serve to reduce the amount of material required to fabricate the reinforcement member without compromising the strength thereof.

In accordance with a second aspect of the invention, a bushing assembly for use of forming a plurality of fibers from a fluid material at an elevated temperature is disclosed. The assembly comprises a structure having a plurality of orifices through which the fluid material passes to form the fibers and at least one reinforcement member. This member comprises a first portion for attachment to the structure and a second portion having a profile with a variable height including at least one apex. The variable height of the reinforcement member including the at least one apex enhances the ability of the structure to resist sagging and extends the service life thereof while minimizing the amount of precious metal used for reinforcement.

The fiber forming structure is typically plate-like, with different width and length dimensions to form a rectangular shape. In one embodiment, at least one reinforcement member extends along a width dimension of the plate, and preferably a plurality of independent, spaced reinforcement members extend width-wise along the plate-like structure. The fiber-forming structure also has an upper surface (the molten glass material contacts this surface) to which the first portion of each reinforcement member may be welded. Each reinforcement member may be fabricated from either a single piece of material or at least two pieces of material secured together, such as by welding.

In accordance with a third aspect of the invention, a reinforcement member portion for use in a bushing assembly having a fiber-forming tip plate including at least one existing gusset is provided. The reinforcement member portion comprises a body for attachment to the gusset and having a profile with a variable height including at least one apex. The variable height and the at least one apex of the reinforcement member portion assists in reinforcing the gusset and hence, at least the adjacent portion of the tip plate, against sagging, which extends the service life thereof while minimizing the amount of precious metal used for reinforcement.

In one embodiment, the gusset has a substantially planar upper surface and the body of the reinforcement member portion includes a web having a first end that is welded to the upper surface of the gusset. The body may have a T-shaped or inverted L-shaped cross section, and the profile of the body may be selected from an arcuate profile, an inverted V-shaped profile, or an inverted W-shaped profile.

In accordance with a fourth aspect of the invention, a method for reinforcing a structure capable of forming fibers from a fluid material supplied to a bushing is disclosed. The method comprises securing at least one reinforcement member to the structure, said reinforcement member comprising a first portion for attachment to the structure and a second portion having a profile with a variable height including at least one apex. The variable height of the reinforcement member including the at least one apex enhances the resistance of the structure to bending stresses and extends the service life thereof while minimizing the amount of precious metal used for reinforcement.

In one embodiment, the securing step comprises securing a plurality of independent reinforcement members to the structure in a spaced relationship. The reinforcement member may comprise a first member defining the first portion and a second member defining the second portion, in which case the securing step comprises securing the first member to the structure, and securing the second member to the first member. The fiber forming structure may further comprise a tip plate including at least one existing gusset, in which case said method further includes attaching the second portion of the reinforcement member to the gusset. The reinforcement member second portion thus assists in preventing both the gusset and the tip plate from sagging as the result of bending stresses and creep.

In accordance with a fifth aspect of the invention, a reinforcement member for use in a bushing assembly for forming fibers from a fluid material at an elevated temperature is provided. The bushing assembly includes a bushing tip plate having an upper surface and a plurality of strategically positioned fiber-forming orifices. The reinforcement member comprises a body having a lower portion including a web for attachment to the upper surface of the bushing tip plate and an upper portion integrally formed with the lower portion. The upper portion has a profile shaped for resisting both a bending stress created partially by the weight of the material and a creep created partially by the elevated temperature of the material over time in combination with the bending stress, and including at least one apex. The variable height profile of the body including at least one apex enhances the resistance of the bushing tip plate to sagging and thereby substantially extends the service life thereof while minimizing the amount of precious metal used for reinforcement.

BRIEF DESCRIPTION OF THE DRAWINGS

FIG. 4a is a partially cutaway, partially cross-sectional, elevational view taken from one end of the reinforcement members of either FIG. 3a or FIG. 3b;

FIG. 4b is a partially cutaway, fully cross-sectional view of the reinforcement member of FIG. 4a, taken at the apex thereof;

FIG. 5a is an embodiment of a reinforcement member formed of at least one piece of material, and further including a plurality of strategically positioned openings for reducing the amount of material used in forming the reinforcement member without significantly compromising the strength thereof;

FIG. 5b is a view taken along view line 5b—5b;

FIG. 6a is a partially cutaway, partially cross-sectional end elevational view of an embodiment wherein the reinforcement member includes a lower portion having an L-shaped cross-section;

FIG. 6b is a partially cutaway, fully cross-sectional view of an embodiment wherein the reinforcement member comprises separate first and second members secured together, such as by welding, with each member having an L-shaped cross-section;

FIG. 7a is a partially cutaway, fully cross-sectional end view of an embodiment wherein the reinforcement member includes a body having a first or lower portion that is T-shaped in cross-section and a second or upper portion having a variable height including an apex, with the body being fabricated from a single piece of material, such as by stamping, forging, or the like;

FIG. 7b is a partially cutaway, fully cross-sectional end view of an embodiment wherein the reinforcement member includes a body having an L-shaped cross-section and having a variable height including an apex, with the body being fabricated from a single piece of material, such as by stamping, forging, or the like;

FIG. 8 is a partially cutaway, side elevational view of a portion of a bushing body including a tip plate with a reinforcement member comprising a body with an arcuate profile having a variable height and a single apex;

FIG. 9 is a view similar to FIG. 8, but with the second portion of the body of the reinforcement member having a height that increases substantially linearly from each end thereof to create an inverted V-shaped profile; and FIG. 10 is a view similar to FIGS. 8 and 9, but with the second portion of the body of the reinforcement member including two apexes to create an inverted W-shaped profile for a two tip plate bushing.

DETAILS DESCRIPTION AND PREFERRED EMBODIMENTS OF THE INVENTION

Figure 1:
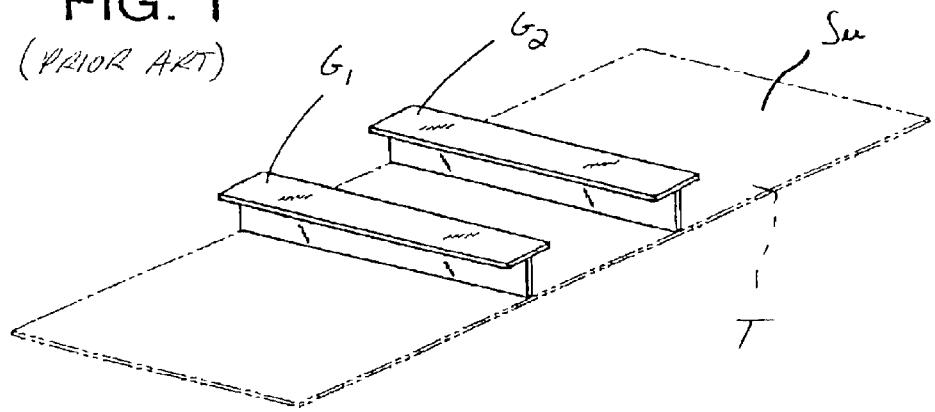
FIG. 1 schematically illustrates one example of a prior art arrangement for reinforcing a tip plate for forming fibers from a fluid material at an elevated temperature, such as glass, by using a plurality of T-shaped gussets having a substantially planar upper surface that creates a rectangular profile.

Reference is first made to FIG. 1, which is a schematic illustration of a portion of a prior art fiber-forming structure wherein a plurality of gussets $G_1$, $G_2$ are attached to the upper surface $S_U$ of a tip plate T (shown in phantom). The tip plate T is formed from platinum, alloys thereof or a like material, and includes between about 10 and 100 small tips or orifices O through which molten material, such as glass, passes (see, e.g., FIGS. 4a and 4b). The molten material contacts the upper surface $S_U$ of the tip plate T prior to it passing through the orifices O to be drawn into fibers. The gussets $G_1$, $G_2$ are formed from platinum, alloys thereof, or a like material. As is known in the art, electric current is typically supplied to the tip plate T from a power source, such as a transformer, to create resistive heating. This heating helps to maintain the glass or other material in a molten state as it passes through the orifices O or tips in the plate T. As noted above, a more detailed description of the overall process is found in the commonly assigned Bobba '727 and Carey '430 patents incorporated herein by reference.

The tip plate T is supported in a bushing body (not shown) having sidewalls and end walls. Together, the side and end walls serve as a frame for supporting or carrying the tip plate T.

Over time, the bending stresses created by gravity, fiber tension and the weight of the molten glass and the concomitant elevated temperature cause the tip plate T to sag, primarily in the "middle" portion (that is, the portion located farthest away from the side and end walls of the corresponding bushing body). It is well known that this sagging reduces the effectiveness of the tip plate T, since it results in a non-uniform thermal distribution and, hence, the creation of fibers of non-uniform diameters due to uneven heat transfer to the cooling fins. Production of fibers of non-uniform diameters is undesirable, and is usually the primary factor that necessitates retiring the tip plate T from service and replacing it with a new or reconditioned one.

Figure 2:
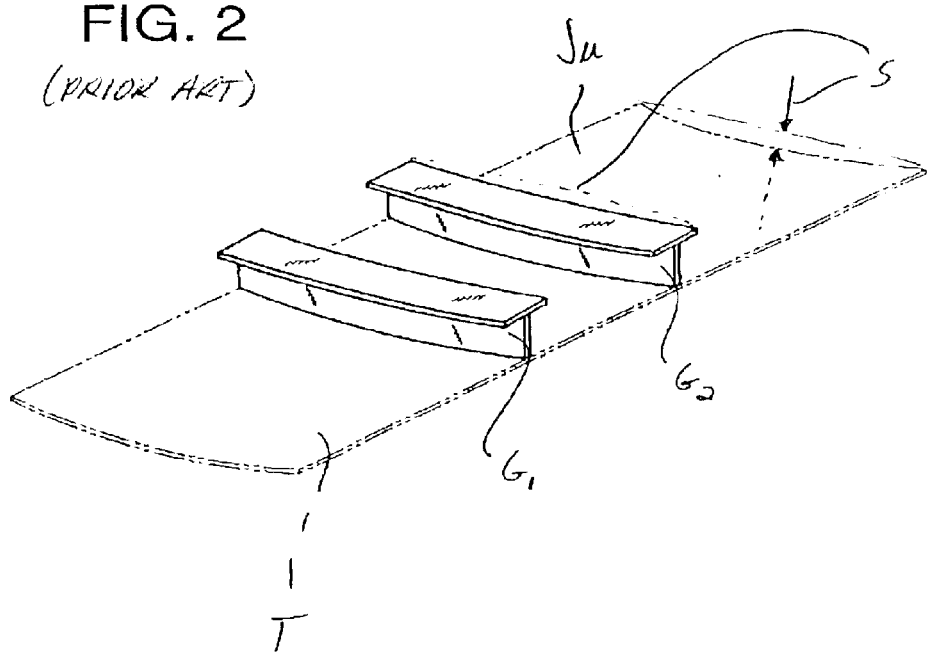
FIG. 2 demonstrates the manner in which the T-shaped gussets of FIG. 1 bend or sag over time, primarily as the result of the creep induced by the bending stresses created by the prolonged contact with glass at an elevated temperature during the fiber-forming process.

While the T-shaped gussets $G_1$, $G_2$ are initially capable of resisting the bending stresses, creep causes a time dependent strain that produces a deflection. As the T-shaped gussets G1, G2 are simple prismatic beams, i.e., constant cross section, the maximum deflection must occur at the span midpoint under uniform loading. Hence, as shown in FIG. 2, the gussets $G_1$, $G_2$ eventually bend or sag along with the tip plate T (note reference numeral S designating the sagging in the vertical dimension shown for purposes of illustration).

Figure 3:
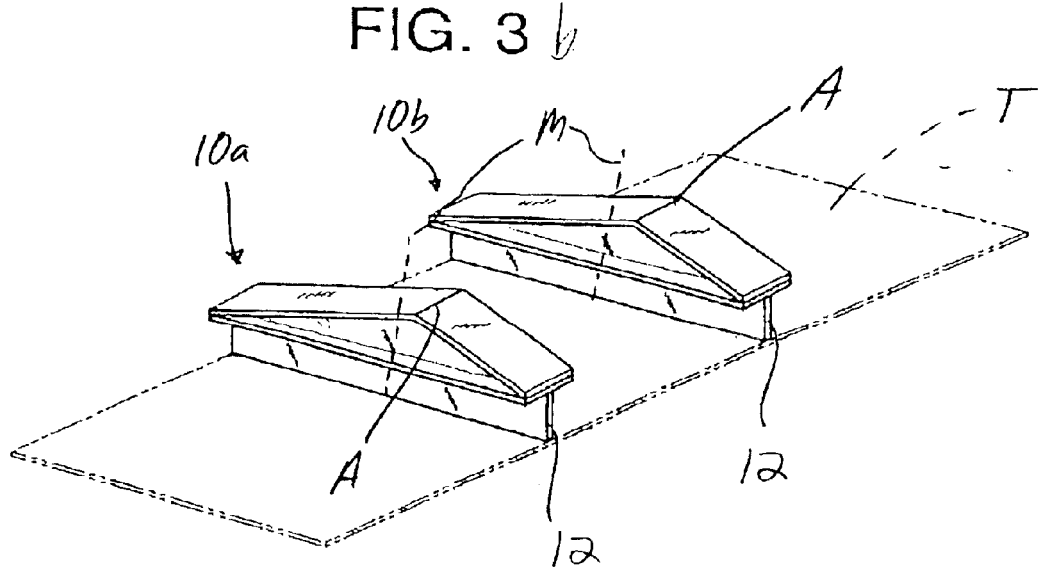
FIG. 3a is a perspective view showing a pair of improved reinforcement members, including a first portion for attachment to the tip plate and a second, upper portion including a profile having a variable height with an apex located at the midpoint between the sidewalls, wherein the reinforcement member reduces the incidence of creep-induced sag and extends the service life of the tip plate.
FIG. 3b is a perspective view showing an alternate embodiment of a pair of improved reinforcement members for reducing the incidence of creep-induced sag and extending the service life of the tip plate, with the apex being located at a point other than the midpoint taken along the length of the body of the reinforcement member.

In an effort to combat this sagging, the present invention includes an improved reinforcement member 10, which may either be used in place of the conventional gusset(s) or may be formed by securing or attaching a separate strengthening member to a conventional gusset(s). FIGS. 3a and 3b each illustrate a tip plate T in phantom including a plurality of spaced reinforcement members 10a, 10b falling into the latter category, and constructed in accordance with one possible embodiment of the present invention. While only two reinforcement members 10a, 10b are shown, it should be appreciated that more or fewer may be provided, depending on the dimensions of the tip plate T and other aspects of the particular application.

Specifically, as perhaps best shown by viewing FIGS. 4a and 4b together with FIG. 3a, each of the plurality of reinforcement members 10a, 10b includes a body having a first, lower portion 12. As should be appreciated from the foregoing discussion, this portion 12 may comprise a conventional gusset already coupled to the tip plate T, or may form part (i.e., the lower portion) of an uncoupled, complete reinforcement member 10 which is intended to be secured directly to the planar upper surface of a tip plate T at various strategic locations.

The lower portion 12 in the illustrated embodiment has a T-shaped cross-section, including: (1) a relatively thin web 14 having a lower end, along which the weld W or other bond, such as a mechanical joint, securing the reinforcement member 10a or 10b to the tip plate T between adjacent rows of orifices O is formed; and (2) a transverse member 16 at the opposite end of the web 14 creating a substantially planar upper surface and defining at least one, and preferably a pair of opposed flanges 18a, 18b. Alternatively, the lower portion 12 may be formed from a single piece of T-shaped material fabricated using stamping, extruding, forging, or other techniques, but this may increase the expense. At the present time, the less expensive, and thus, preferred manner of forming the reinforcement member 10a or 10b is by securing the transverse member 16 directly to the web 14, such as by laser or TIG welding (note welds W in the embodiment shown in FIGS. 4a and 4b). The lower portion 12 is preferably formed from platinum, alloys thereof or a like material.

The reinforcement members 10a, 10b further include an upper portion 20, also having a T-shaped cross-section including a web 22 and a transverse member 24. This transverse member 24 thus creates at least one, and preferably a pair of opposed flanges 26a, 26b that define an upper surface US (see FIG. 4a). As with the lower portion 12, these flanges 26a, 26b may be created using a separate piece of material welded or otherwise bonded to the upper end of the web 22. However, the use of a single piece of material to form the upper portion 20 is also possible, such as one constructed using known stamping, or forging techniques. In this particular embodiment, and as perhaps best shown in FIG. 4a, the lower end of the web 22 of the upper portion 20 may be attached to the upper surface of the transverse member 16 of the lower portion 12, such as by welding or any other means for forming a secure, permanent or semi-permanent bond. The upper portion 20 preferably is formed from the same material used to form the lower portion 12, which materials are set out above.

The upper portion 20 of each reinforcement member 10a or 10b includes a profile with a variable height that forms at least one apex A. Thus, in the embodiment of FIG. 3a, the slope or height of the upper end 22a of the web 22 increases linearly from each end of the reinforcement member 10a or 10b, such that the apex A is positioned substantially at the midpoint M along the length thereof (which may also coincide with the midpoint between the sidewalls of the bushing body (not shown, but see, e.g., FIGS. 8–10)). Further, the web 22, in the illustrated embodiment, has triangular-shaped side portions 22b and 22c, see FIGS. 3a and 4b. The transverse member 24 (or members) also assist in defining this profile.

The end result of this arrangement is that, in terms of susceptibility to bending stress and creep, the maximum or peak resistance to bending is theoretically provided at the midpoint M, which is the precise location where the sagging is typically the greatest. Also, in this particular embodiment, the added weight is kept to a minimum while still providing the desired degree of reinforcement by providing the upper portion 20 with a T-shaped cross-section, as opposed to simply using a solid block of material. By also forming each reinforcement member 10a or 10b from separate pieces of material sequentially welded together, the overall cost required for implementing this arrangement may be minimized. This mode of construction may also allow for the reinforcement members 10a or 10b to be easily retrofitted onto tip plates T already in service having existing gusset(s) (in which case only the upper portion 20 of the embodiment shown in FIGS. 3a, 4a, and 4b need be provided).

In the embodiment of FIG. 3b, the profile of the upper portion 20, including the transverse member(s) 24, varies in height and includes at least one apex A. However, the web 22 is asymmetrical, with each side having a different slope. As a result, the apex A does not fall at the midpoint M (note dashed vertical lines) between the ends of the lower portion 12 of the reinforcement member 10a, 10b (or the sidewalls of the bushing body, in the case where the ends of the lower portion 12 of the reinforcement member are coextensive therewith). This arrangement or any variation thereof may be useful in special situations where the location of the maximum bending stress across the tip plate T is not necessarily at the midpoint M or other design criteria preclude placing the apex at the midpoint. In these situations, the approximate location for placing the apex A may be determined empirically or predicted using well-known analytical or other modeling techniques, such as finite element analysis.

FIG. 5a is a side elevational view and FIG. 5b is a cross-sectional view of another embodiment of a reinforcement member 110. In this embodiment, the lower and upper portions 112, 120 are defined by a single piece of material having a T-shaped cross-section, but may be defined by two separate pieces of material. More specifically, the lower portion 112 is defined by a lower portion 114a of a single, vertically oriented web 114. The lowermost end of this web 114 is attached to the surface of the tip plate T, such as by welding, between adjacent rows of orifices O extending along the width thereof.

The upper portion 120 of the reinforcement member 110 includes an upper portion 114b of the web 114, as well as at least one transverse member 124 attached to the upper end thereof The transverse member 124 defines at least one, and preferably a pair of opposed flanges 126a, 126b. As with the embodiments described above, the flanges 126a, 126b may instead be separately attached, such as by welding or other permanent or semi-permanent bonding (see FIG. 5a). The upper portion 120 of the reinforcement member 110, including the transverse member(s) 124 and the upper web portion 114b, also has a variable height when viewed in profile to define at least one apex A. As with the embodiment in FIG. 3a, the apex A is shown as being located substantially at the midpoint M between the ends of the reinforcement member 110. By positioning the apex A at this location, which is typically where the maximum bending stress is created, the ability of the corresponding portion of the tip plate T to resist sagging is greatly enhanced, which in turn extends the service life. As noted above, it should be appreciated that the embodiment shown in FIG. 5a could also be constructed such that the apex A (or multiple apexes; see, e.g., FIG. 10) does not coincide with the midpoint M. This arrangement may be useful in cases where the maximum stress or bending might not be at the midpoint M or other design criteria precludes placing the apex at the span midpoint.

FIG. 5a also demonstrates one manner in which apertures or openings 130 may also be provided in the reinforcement member 110, such as in the web 124. These apertures or openings 130 reduce the overall amount of material required during fabrication, and thus reduce the cost and weight contribution of each reinforcement member 110. However, the openings 130 are sized and strategically positioned such that no significant reduction in the resistance to bending stresses or sagging results. In the example shown, three such openings 130 are provided, but fewer or more may be provided. Also, while circular openings 130 are shown for purposes of illustration, it should be appreciated that any shape may be used, as long as the result is that the reinforcement in strength provided to the tip plate T remains uncompromised. Moreover, while the openings 130 are shown in the embodiment of FIG. 5a, it should be appreciated that any of the other embodiments may benefit from their presence, either in the upper portion (see, e.g., FIG. 9), the lower portion (not shown), or in both portions of the reinforcement member (not shown).

It is believed that the reinforcement member 110 illustrated in FIG. 5a provides optimal strength with minimal metal weight.

Another embodiment is depicted in the partially cutaway, partially cross-sectional, end elevational view of FIG. 6a. In this embodiment, the reinforcement member 210 has a lower portion 212 having a cross-section in the shape of an inverted "L." The lower end of the web 214 of the "L" is secured to the surface of the tip plate T between adjacent rows of orifices, such as by welding (note welds W). The upper portion 220 of the reinforcement member 210 is also L-shaped in cross-section, as perhaps best understood with reference to the cross-sectional view of FIG. 6b. Thus, it too includes a web 222 that is secured to the transverse member 216 of the lower portion 212, such as by welding, to provide the resulting reinforcement member 210 with an F-shaped cross-section. This reinforcement member 210 is thus integrally formed with the tip plate T by welding the L-shaped member forming the lower portion 212 to the tip plate T, either before or after the L-shaped member forming the upper portion 220 has been welded to the lower portion 212. However, as noted above, it is of course possible, but more expensive, to create the entire reinforcement member 210 from a single piece of material having an F-shaped cross-section that is then welded directly to the tip plate T.

Although not specifically illustrated, it should also be appreciated that to reduce the effects of sagging and extend the service life of the tip plate T, the upper portion 220 of the reinforcement member 210 has a variable height when viewed in profile, and thus defines at least one apex A. Indeed, in an embodiment of reinforcement member 210 where the height increases linearly from the sides to the midpoint, the actual side elevational view from the right side of FIG. 6b would be identical to one taken looking from the left or right side of FIG. 3a, with the observer's eye at or near the horizontal plane defined by the tip plate T. The view from the opposite, or left hand side of FIG. 6b would be similar to the view in FIG. 5a, but without the flange 126a or 126b shown along the top of the reinforcement member and with a partial or full length bead present where the web 222 of the upper portion 220 is welded directly to the upper surface of the transverse member 216 of the lower portion 212.

Still another possible embodiment is shown in FIG. 7a. In this embodiment, the entire reinforcement member 310, including the lower and upper portions 312, 320, is fabricated from a single piece of material, similar to one version of the embodiment shown in FIG. 5a. However, in addition to flanges 326a, 326b, the member 310 also includes integral flanges 318a, 318b that add strength and further help in resisting sagging. While this embodiment uses more material and is thus slightly heavier than the one shown in FIG. 5a (and also costs more to manufacture using current stamping or forging techniques), it reduces the amount of welding required as compared to the embodiment of FIG. 3a, since welds are required only at the interface between the lower end of the web 314 and the surface of the tip plate T. Also, it may find utility in situations where the tip plate T is exceedingly wide, or others where a more substantial reinforcement is required.

A similar embodiment of a reinforcement member 310 formed of a single piece of material having an L-shaped cross-section is shown in FIG. 7b. This reinforcement member 310 also has a variable height profile with an apex (not shown). When viewed from the right hand side of FIG. 7b, the view is similar to that of FIG. 5a (possibly without the optional openings 130).

Up to this point, the reinforcement members 10, 110, 210, 310 have been shown and described for use on a single, substantially planar tip plate T that extends between a pair of sidewalls in a bushing body (not shown). However, it is also possible to use the reinforcement members 10, 110, 210, 310 in situations where a "double-bottomed" bushing is provided. This is illustrated in FIGS. 8–10, with only one half of each "double-bottomed" bushing shown in FIGS. 8 and 9 (note centerline L), and a full "double-bottomed" bushing shown in FIG. 10.

In the first embodiment, the reinforcement member 410 has an upper portion 420 similar to the others described above. The difference is that instead of an apex A formed by linearly increasing the height from the spaced ends, the height is varied non-linearly from each side so as to create an arcuate profile. Preferably, as with the other embodiments, the apex A is located substantially at the midpoint M between the ends of the reinforcement member 410 to provide the optimum resistance to bending stresses, and hence, time-induced plastic deformation (creep). In this embodiment, the apex A does not coincide with the midpoint between the sidewalls (only one sidewall $S_1$ is shown in FIG. 8), which may fall at or near the centerline L.

It should also be appreciated that the embodiment of FIG. 8 may be formed like the one in FIG. 3a, with the upper portion 420 having the arcuate profile separately welded or attached to an upper surface defined by a transverse member 416 creating opposed flanges 418a or 418b (only one shown in FIG. 8). The lower portion 412 is in turn secured to the surface of the tip plate T between adjacent rows of orifices O, and could possibly take the form of an existing gusset G, with the upper portion 420 merely serving as an add-on strengthening or reinforcement member. Both the end elevational and cross-sectional views of this embodiment are substantially the same as those in FIGS. 4a and 4b, but could also be like those in FIGS. 6a and 6b as well.

Alternatively, the reinforcement member 410 with the upper portion 420 having the arcuate profile may be fabricated from a single piece of material. Still another alternative is to form the upstanding portion or web 422 from a single piece of material, and then separately attach the curved transverse member 424, such as by welding. In any of these cases, both the upper and lower portions 412, 420 may have T-shaped or L-shaped cross-sections (with both preferably having the same cross-sectional shape). Also, although not shown in FIG. 8, it should be appreciated that either portion may include weight-reducing apertures or openings.

Still referencing FIG. 8, it is further noted that in the illustrated embodiment, the upper portion 420 stops short of the sidewall $S_1$ as does the transverse member 416 defining the flanges 418a or 418b (only one shown). The clearance thus created allows for the welder to gain access to the sidewall $S_1$ so that a weld may be laid along the corresponding end of the web 414. This clearance is particularly helpful in the case where a plurality of closely spaced reinforcement members are provided (not shown).

The embodiment shown in FIG. 9 includes a combination of features taken from the embodiments of FIGS. 3a–4b, 5a, and 9. The upper portion 520 of the reinforcement member 510 has an inverted, V-shaped profile with an apex A, and is formed from a separate piece of material that is welded or otherwise secured to the transverse member 516 of the lower portion 512 (both of which may have a T-shaped or L-shaped cross-section). A plurality of relatively small, strategically positioned openings 530 are also provided in the upper portion 520, which as noted above decrease the weight of the resulting reinforcement member 510 without substantially compromising the strength. The upper portion 520 also creates a gap with the sidewall $S_1$. As noted in the previous paragraph, this is optionally done to provide access to the interface between the end of the lower portion 512 and the sidewall $S_1$.

In the embodiment shown in FIG. 10, the first noteworthy point is that the full "double bottom" bushing B or bushing assembly is shown in cross-section, including the spaced sidewalls $S_1$, $S_2$ and the tip plate(s) T. In the illustrated embodiment, the tip plates T are integrally connected with an inverted V-shaped channel C. This channel C extends along the length of the bushing B to provide enhanced structural support, and may be filled with a refractory material R to insulate against heat losses to a water cooled support (not shown). As is known in the art, the refractory material R usually also surrounds the entire bushing B to not only thermally insulate it from the ambient environment, but also electrically insulate it from other structures.

Secured to the surface of each tip plate T is a reinforcement member 610. The reinforcement member 610 includes a lower portion 612, which as noted above may be formed by the gussets having a T-shaped or L-shaped cross-section already present on the tip plate T. The upper portion 620 in this embodiment has a profile that varies in height to define two apexes $A_1$, $A_2$, one positioned substantially at the midpoint of each tip plate T. Thus, the profile of the upper portion 620 has the shape of an inverted W. The upper portion 620 may be formed of a single piece of material, including a continuous web 622, or may have one or more transverse members 624 (two shown in FIG. 10) that are separately welded in place. Alternatively, both the lower and upper portions 612, 620 may be formed from a single piece of material, along with the transverse member 624 defining at least one, and preferably a pair of opposed flanges. The upper portion 620 is also shown as having ends that are spaced from the sidewalls $S_1$, $S_2$ to permit access during welding, but as described above, this is optional.

The foregoing descriptions of embodiments of the present invention are presented for purposes of illustration and description. These descriptions are not intended to be exhaustive or to limit the invention to the precise form disclosed. Obvious modifications or variations are possible in light of the above teachings. For example, while only a single reinforcement member or pair of reinforcement members are shown in the various drawings, it should be appreciated that any number required to provide the desired degree of reinforcement/resistance may be used at any spaced interval along the tip plate. Also, the reinforcement members, whether formed from a single piece of material, multiple pieces of material, or as add-ons to existing gussets, may be placed only at locations susceptible to the maximum bending stresses, with other locations either having the conventional gussets or no reinforcement. Infinite variations on the shapes of the profiles or cross-sectional shapes of the various reinforcement members or components thereof may also be made, while still possibly achieving an acceptable level of reinforcement/resistance. For example, while T-shaped, F-shaped, and inverted L-shaped cross-sections create a minimal point of contact with the tip plate and minimize the added weight, the reinforcement member could have a C-shaped, I-shaped, or E-shaped cross-section as well, or any variation thereof. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. In a bushing assembly having a plate-like structure including a plurality of orifices for forming fibers from a fluid material, a member for reinforcing the structure, comprising:
    a body including a first portion for attachment to the structure and a second portion having a profile with a variable height including at least one apex, wherein the body is comprised of a single piece of material and wherein the body, including the first and second portions, has an inverted L-shaped, T-shaped, or F-shaped cross-section;
    whereby the variable height profile and the at least one apex of the body assists in reinforcing the structure against sagging and extends the service life thereof while minimizing metal usage.

2. The reinforcement member according to claim 1, wherein the second portion of the body has an arcuate profile, an inverted V-shaped profile, or an inverted W-shaped profile.

3. The reinforcement member according to claim 1, wherein the body has a length including a midpoint, and wherein the at least one apex is located substantially at the midpoint.

4. The reinforcement member according to claim 1, wherein the bushing assembly includes spaced sidewalls to which a first and second end of the body are secured, respectively, and wherein the at least one apex is located between the spaced sidewalls.

5. The reinforcement member according to claim 1, wherein the body comprises:
    a first member defining the first portion for attachment to the structure; and
    a second member coupled with the first member, defining the second portion and having the variable height profile with the at least one apex.

6. The reinforcement member according to claim 5, wherein the first member has a T-shape or an inverted L-shape in cross-section.

7. The reinforcement member according to claim 5, wherein the second member has a T-shape or an invaded L-shape in cross-section and is formed from one or more component parts.

8. The reinforcement member according to claim 5, wherein the second portion has an arcuate profile, an inverted V-shaped profile, or an inverted W-shaped profile.

9. The reinforcement member according to claim 5, wherein the second member includes a web having an end that is welded directly to an upper surface of the first member.

10. The reinforcement member according to claim 1, wherein the second portion of the body includes at least two apexes.

11. The reinforcement member according to claim 1, wherein either the first or the second portion of the body includes a plurality of strategically positioned openings, whereby the openings serve to reduce to amount of material required to fabricate the reinforcement member without compromising the strength thereof.

12. A bushing assembly for use in forming a plurality of fibers from a fluid material at an elevated temperature comprising:
    a structure having a plurality of orifices through which the fluid material passes to form the fibers;
    at least one reinforcement member having a first portion for attachment to the structure and a second portion having a profile with a variable height including at least one apex, wherein the reinforcement member is comprised of a single piece of material and wherein the reinforcement member, including the first and second portions, has an inverted L-shaped, T-shaped, or F-shaped cross-section;
    whereby the variable height of the reinforcement member including the at least one apex enhances the resistance of the structure to sagging and extends the service life thereof while minimizing metal usage.

13. The bushing assembly according to claim 12, wherein the fiber forming structure is plate-like, and wherein the at least one reinforcement member extends along a width dimension thereof.

14. The bushing assembly according to claim 13, wherein a plurality of independent, spaced reinforcement members extending along the width of the plate-like structure.

15. The bushing assembly according to claim 14, wherein the fiber-forming structure has an upper surface to which the first portion of each of the reinforcement members is welded.

16. The bushing assembly according to claim 12, wherein the reinforcement member is fabricated from either a single piece of material or at least two pieces of material secured together.

17. The bushing assembly according to claim 12, wherein the structure includes at least one existing gusset, and wherein the second portion of the reinforcement member is attached to the gusset.

18. In a bushing assembly for forming fibers from a fluid material at an elevated temperature using a bushing tip plate having an upper surface and including a plurality of strategically positioned fiber-forming orifices, a reinforcement member, comprising:

a body having a lower portion including a web for attachment to the upper surface of the bushing tip plate and an upper portion coupled with the lower portion, said upper portion having a variable height profile shaped for resisting both a bending stress created partially by the weight of the material and a creep created partially by the elevated temperature of the material over time in combination with the bending stress, said profile including at least one apex, whereby the profile of the body including the at least one apex enhances the resistance of the bushing tip plate to sagging and thereby substantially extends the service life thereof while minimizing metal usage.

\* \* \* \* \*